US007792856B2

(12) United States Patent
Fuxman et al.

(10) Patent No.: US 7,792,856 B2
(45) Date of Patent: *Sep. 7, 2010

(54) ENTITY-BASED BUSINESS INTELLIGENCE

(75) Inventors: Ariel Fuxman, San Jose, CA (US);
Peter Jay Haas, San Jose, CA (US);
Berthold Reinwald, San Jose, CA (US);
Yannis Sismanis, San Jose, CA (US);
Ling Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 11/771,668

(22) Filed: Jun. 29, 2007

(65) Prior Publication Data

US 2009/0006331 A1    Jan. 1, 2009

(51) Int. Cl.
G06F 17/30 (2006.01)
G06F 7/00 (2006.01)
(52) U.S. Cl. .................. 707/769; 707/602; 707/718
(58) Field of Classification Search ................ None
See application file for complete search history.

(56) References Cited

U.S. PATENT DOCUMENTS

| | | | |
|---|---|---|---|
| 6,519,604 B1 * | 2/2003 | Acharya et al. | 707/102 |
| 6,574,623 B1 | 6/2003 | Leung et al. | |
| 6,775,662 B1 | 8/2004 | Witkowski et al. | |
| 6,775,681 B1 | 8/2004 | Ballamkonda et al. | |
| 6,775,682 B1 | 8/2004 | Ballamkonda et al. | |
| 7,035,843 B1 | 4/2006 | Bellamkonda et al. | |
| 2003/0184811 A1 * | 10/2003 | Overton | 358/3.27 |
| 2004/0210763 A1 | 10/2004 | Jonas | |
| 2005/0027690 A1 | 2/2005 | Zhang et al. | |
| 2006/0020619 A1 * | 1/2006 | Netz et al. | 707/102 |

OTHER PUBLICATIONS

Arenas et al. "Scalar Aggregation in Inconsistent Databases" Theoretical Computer Science, ICDT 2001 Department of Computer Science and Engineering, University of Buffalo, Buffalo NY.*
Fuxman et al. "ConQuer: Efficent Management of Inconsistent Databases" SIGMOD Jun. 14-16, 2005, Baltimore, Maryland Copyright 2005 ACM.*
Fuxman A et al: "ConQuer: Efficient Management of Inconsistent Databases" Proceedings of the 2005 ACM SIGMOD International Conference on Management of Data, [Online] Jun. 14-16, 2005, pp. 155-166, XP002489781 Baltimore, Maryland, USA ISBN: 1-59593-060-4 Retrieved from the Internet: URL:http://portal.acm.org/citation.cfm?doid=1066176> [retrieved on Jul. 24, 2008] the whole document.
Ananthakrishna R et al: "eliminating Fuzzy Duplicates in Data Warehouses" VLDB2002, 2002, XP008094697 Hong Kong, China the whole document.
Patent Cooperation Treaty International Search Report and the Written Opinion dated Aug. 7, 2008.

* cited by examiner

*Primary Examiner*—Pierre M Vital
*Assistant Examiner*—Berhanu Mitiku
(74) *Attorney, Agent, or Firm*—Shimokaji & Assoc. P.C.

(57) ABSTRACT

A method is disclosed for conducting a query to transform data in a pre-existing database, the method comprising: collecting database information from the pre-existing database, the database information including inconsistent dimensional tables and fact tables; running an entity discovery process on the inconsistent dimensional tables and the fact tables to produce entity mapping tables; using the entity mapping tables to resolve the inconsistent dimensional tables into resolved dimensional tables; and running the query on a resolved database to obtain a query result, the resolved database including the resolved dimensional table.

1 Claim, 3 Drawing Sheets

ENTITY-BASED BUSINESS INTELLIGENCE

BACKGROUND OF THE INVENTION

1. Field of Invention

The present invention relates generally to the field of online analytic processing of data. More specifically, the present invention is related to aggregation queries over dynamically discovered entities, that appear with different guises in a database, without explicitly resolving the correct values for the attributes of the entities.

2. Discussion of Prior Art

Modern business intelligence routinely makes extensive use of customer and transactional data obtained from databases stored in data warehouses. Such business intelligence may typically be obtained by posing an analytical query to one or more associated relational databases. Execution of the analytical query may require data processing involving extensive tabular calculations, time series analyses, and retrieval of various aggregated data. These data are typically organized into tables of columns and rows, or tuples, with many tables comprising multiple tuples and multiple columns. Such data processing is generally referred to as online analytical processing (OLAP) and may include software designed to access and process raw data for use by business data analysts.

The business intelligence thus requires the integration of a plethora of different sources. Dimensional information such as customers, suppliers, and products from different sources very often overlap and appear with different guises in different systems. Even operational systems within an enterprise are usually isolated without any data integrity. The situation may be exacerbated by business acquisitions or mergers and partnerships which bring together disparate data sources, and by the increasing use of internal application data with outside data, such as may be generated by retailers and syndicated data feeds.

Entity Discovery is the process of determining if multiple instances are actually the same entity (like customer, supplier or product). Such a process can be automated and usually works by examining and combining similarities between the attributes of an entity. For example, consider two customer instances <John, Simpson, 555-123-4568, San Jose> and <Johnny, Simpsson, 555-123-4567, San Franscisco>. The high similarities between the first name, last name and phone can be an indicator that the two customers are one entity.

Entity Resolution is the process of determining the correct values for the attributes of an entity. For the example above, the correct values can be <John, Simpson, 555-123-4567, San Franscisco>. Typically the entity resolution is performed statically on a data-warehouse and is very time-consuming. However such an approach is seldom exact. Additional corrections may be required as more instances become available rendering the static resolution obsolete.

The phenomenon where the same entity appears with different attributes values in different systems is called "Data Inconsistency" and the corresponding databases are called "Unresolved Databases". Data inconsistency can have deleterious effects on business intelligence applications if it is not treated correctly. Performing aggregation directly on unresolved databases typically generates erroneous results. To illustrate the present state of the art, reference is made to Tables 1 and 2 that provide an example of sales activity with sales data integrated from two different operational systems.

TABLE 1

CUSTOMER DATA

| Operational System | Name | CustID | City | State |
| --- | --- | --- | --- | --- |
| 1 | John | $C_1$ | San Francisco | CA |
| 2 | Johnny | $C_2$ | San Jose | CA |
| 1 | Jack | $C_3$ | San Francisco | CA |
| 1 | William | $C_4$ | San Francisco | CA |
| 2 | Bill | $C_5$ | San Jose | CA |

In Table 1, customers (i.e., Instances) identified by CustID labels $C_1$, $C_3$ and $C_4$ may originate from a first operational system and customers identified by CustID labels $C_2$ and $C_5$ may originate from a second operational system. Transactional data corresponding to the customers listed in Table 1 are given in Table 2:

TABLE 2

TRANSACTION FACT DATA

| Operational System | TransID | CustID | SalesAmt |
| --- | --- | --- | --- |
| 1 | Tr1 | $C_1$ | $20 |
| 2 | Tr2 | $C_2$ | $50 |
| 1 | Tr3 | $C_3$ | $30 |
| 1 | Tr4 | $C_4$ | $90 |
| 2 | Tr5 | $C_5$ | $40 |

An analytical query may be placed to determine, for example, a reply to the inquiry, "What is the sum of sales grouped by city and state?" For the data presented in Tables 1 and 2, unresolved aggregation results may be given by Table 3:

TABLE 3

UNRESOLVED AGGREGATION RESULTS

| City | State | SalesAmt |
| --- | --- | --- |
| San Francisco | CA | $140 |
| San Jose | CA | $90 |

It can be appreciated by one skilled in the art that it is very common for a particular customer to appear under different guises in different data sources. An entity discovery process can be used to provide an entity mapping, such as shown in Table 4:

TABLE 4

ENTITY MAPPING

| EntityID | CustID |
| --- | --- |
| $e_1$ | $C_1$ |
| $e_1$ | $C_2$ |
| $e_2$ | $C_3$ |
| $e_3$ | $C_4$ |
| $e_3$ | $C_5$ |

By inspection, it can be seen that customer $C_1$ from the first data source is most probably the same customer as customer $C_2$ from the second data source. Accordingly, an EntityID label $e_1$ may be used to refer to both customers $C_1$ and $C_2$. Similarly, customer $C_4$ from the first data source is most probably the same customer as customer $C_5$ from the second data source. An EntityID label $e_3$ may be used to refer to both the customers $C_4$ and $C_5$. In the present state of the art, a warehouse administrator may use this information to manually resolve the data by choosing the correct dimensional data for such entities, as presented in Table 5.

TABLE 5

POSSIBLE RESOLVED CUSTOMER DATA

| EntityID | City | State |
|---|---|---|
| $e_1$ | San Francisco | CA |
| $e_2$ | San Francisco | CA |
| $e_3$ | San Francisco | CA |

An example of a resolved aggregation from Tables 3 and 4, resulting from such an entity discovery and resolution process and performed in accordance with the present state of the art, may provide the result given in Table 6:

TABLE 6

POSSIBLE RESOLVED AGGREGATION RESULT

| City | State | Sales |
|---|---|---|
| San Francisco | CA | $230 |

It can be appreciated that the actual dimensional information of an Instance, such as a customer, may be unknown. Although different techniques can be applied in order to identify the same, or equivalent, customers, the problem of assigning the "correct" dimensional information (e.g., address, age, income range) to the corresponding entity is a dynamic task. That is, as more data become available, the Entity Discovery and Resolution continues to change so that the resolved aggregation results change. Accordingly, the result in Table 6 is most likely incorrect as the conventional process producing the result failed to take into account the step of establishing the identity of different Instances as the same customer.

The inconsistencies of the data can disappear at higher hierarchical levels for domains like time, location, customer age or income range. For example, in Tables 5 and 6 it can be seen that the aggregation result for the State CA is correct since the inconsistency at the state level for the given customer data disappears at the state level.

From the above, it is clear that there is a need for a principled and correct way of performing aggregations over inconsistent data.

SUMMARY OF THE INVENTION

The present invention is a method for performing aggregations in a pre-existing database, comprising: collecting database information from the pre-existing database, the database information including inconsistent dimensional tables and fact tables; running an entity-discovery process on the inconsistent dimensional tables and the fact tables to produce entity mapping tables; using the entity mapping tables at query time to provide all possible resolutions for the inconsistent dimensional tables efficiently performing the aggregation over all possible resolutions and returning a strict range with an upper bound and a lower bound for aggregation functions including sum, count, min, and max.

In another embodiment of the present invention, an apparatus for transforming data in a data warehouse comprises: a data storage device for storing the data; a computer program in communication with a computer, the computer program for performing a method including the steps of: using an entity mapping table for dimensional tables to generate an auxiliary table with entity listings, the auxiliary table further having hierarchical status and probability entries for the entity listings; performing the aggregation over all possible resolutions and returning not only a strict range but also a mean and variance for the result of the aggregation function.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In accordance with the present invention, the innovative method of an entity-based business intelligence (EBI) query process functions to load inconsistent data into the data warehouse, execute an entity discovery process and dynamically use possible entity resolutions at query time, rather than statically resolving entities using extract, transfer, and load (ETL) scripts. This approach avoids expensive initial ETL processing and better matches the incremental warehouse maintenance. The EBI query process provides the basic framework for performing aggregation on unresolved databases, and utilizes unique algorithms for both group-by queries and roll-up/drill-down queries over all the core aggregation functions.

Current art (i) does not address the aggregation of unresolved databases under queries with some fundamental OLAP operations, such as roll-up, and (ii) lacks some concepts that are necessary for a principled semantics for OLAP queries on such unresolved databases, such as the notion of "non-guaranteed" answers. In contrast, the disclosed EBI method functions to enhance the online analytical processing (OLAP) model to incorporate inconsistency of dimensional data in query results. In particular, the EBI method functions to perform roll-up operations and provide an answer for a single aggregate, where the answer is not a single number, but a tight range of possible values, a certainty status indicator, and—under certain conditions—a mean and variance.

The disclosed EBI method provides for: (1) an initial step of entity resolution; (2) use of a "non-guaranteed" notion in the semantics for answers that may not appear in a consistent database; (3) computation of roll-up operations, which are fundamental for OLAP applications; and (4) materialization of intermediate results. Additionally, "guaranteed answers" are produced when entity resolution has been done and a query is run directly on an inconsistent database.

Figure 1:
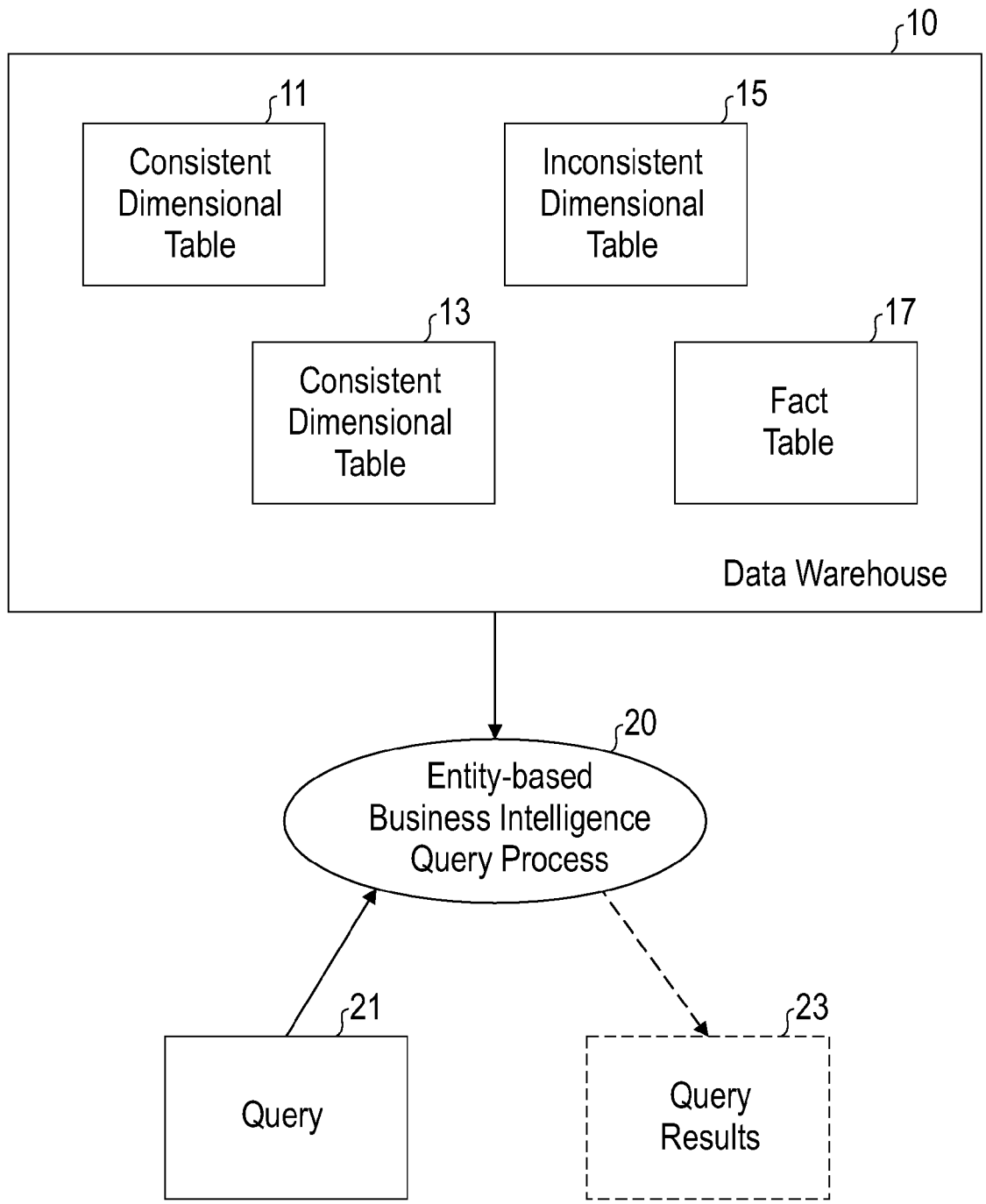
FIG. 1 is a diagrammatical illustration of query results derived from a data warehouse using an entity-based business intelligence query process, in accordance with the present invention.

There is shown in FIG. 1 a scalable data warehouse 10 comprising a plurality of data tables, exemplified by consistent dimensional tables 11, 13, and an inconsistent dimensional table 15, and a plurality of fact tables, exemplified by a fact table 17. The configuration shown may be implemented using one or more computer programs under the control of an operating system, such as OS/2™, Windows™, and Unix™, and may be implemented on a single computer, on multiple computers, or in a computer network. One skilled in the art may use the present specification to implement the configuration of FIG. 1 as a process, a machine, or an article of manufacture by means of standard programming and engineering methods to produce a corresponding software, firmware, and/or hardware product. More generally, the configuration shown may be tangibly embodied in an article of manufacture, such as computer-readable medium, a data storage device, and/or a data communications device.

A query 21 may be applied via an EBI query process 20 that accesses the data warehouse 10 for data from the clean dimensional tables 11 and 13, the inconsistent dimensional table 15, and the fact table 17. The objective is to provide a set of query results 23 that may be returned by the EBI query process 20. The consistent dimensional tables 11 and 13 are presumed to require no resolution. Unlike the consistent dimensional tables 11 and 13, the inconsistent dimensional table 15 is an unresolved data table and may require resolution, such as exemplified by the Customer Data of Table 1, above, to produce a resolved data table. The fact table 17 may comprise data such as exemplified by the Transaction Fact Data in Table 2, above.

Figure 2:
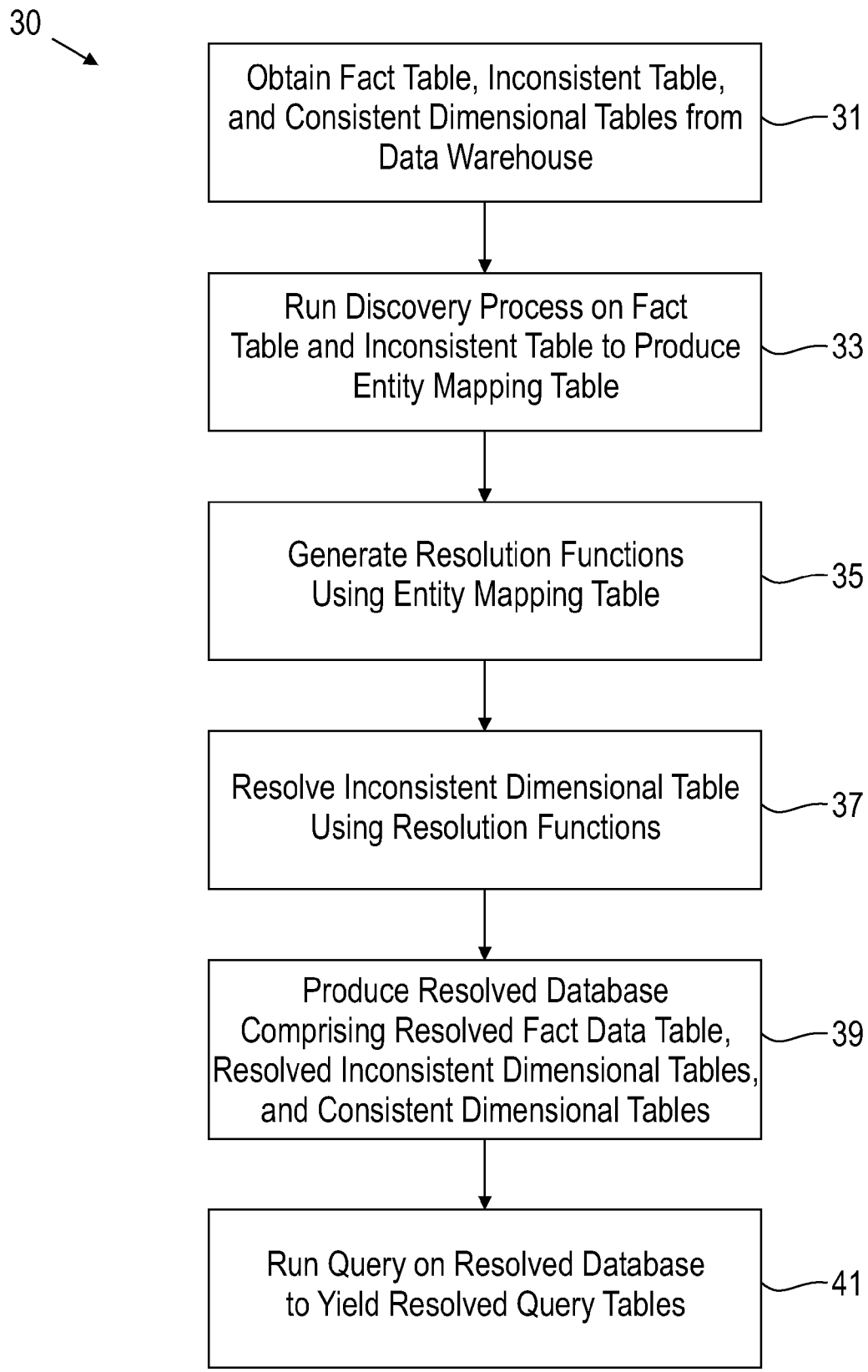
FIG. 2 is a flow chart describing the entity-based business intelligence query process, in accordance with the present invention, as can be practiced with the data warehouse of FIG. 1.

As understood in the present state of the art, the EBI query process 20 may comprise computer software loaded from memory, a data storage device, and/or a data communications device into a computer device (not shown), that is under the control of an operating system. The EBI query process 20 of the present invention can be described with reference to the flow diagram 30, in FIG. 2.

The consistent dimensional tables 11 and 13, the inconsistent dimensional table 15, and the fact table 17 are obtained from the data warehouse 10, at step 31. An entity discovery process may be performed on both the fact table 17 and the inconsistent dimensional table 15 to produce an Entity Mapping table 49, at step 33. By way of example, an entity discovery process performed on the Customer Data in Table 1 and the Transaction Fact Data in Table 2 may produce the Entity Mapping Data listed in Table 4.

The Customer Identifier (i.e., CustID) column of the Customer Data of Table 1 may be partitioned into sets, in such a way that for each real-world entity there is exactly one set of tuples. Each set may comprise one of the Entity Mappings of Table 4. Table 4 comprises two attributes: one attribute for set identifiers, referred to herein as an "Entity Identifier" (i.e., Entity-ID), and another attribute for identifiers obtained from inconsistent tables, referred to herein as an "Instance Identifier." It can be appreciated by one skilled in the art that the Entity Identifiers can be resolved to corresponding Instance Identifiers via a Resolution Function and that Instance Identifiers are mapped to Entity Identifiers via a Mapping Table.

For the Entity Mappings in Table 4, the $C_1$ tuple and the $C_2$ tuple (comprising a first set group) both correspond to the same Entity $e_1$, the C3 tuple corresponds to Entity $e_2$ (comprising the second set group) and the $C_4$ tuple and the $C_5$ tuple (comprising a third tuple group) both correspond to the same Entity $e_3$. The process of selecting the correct tuple from each group, referred to herein as the "mapping of the corresponding database," produces a Resolved Dimensional Table. In accordance with the present method, all possible ways of resolving the database are considered, as it is not known in advance which tuple is the correct tuple. A Resolved Dimensional Table may be obtained by applying a Resolution Function that associates each Entity to exactly one Instance. Accordingly, two or more Resolution Functions may be generated from the Entity Mapping Table 49, at step 35.

A Resolution Function can be defined as follows. Let M be an Entity Mapping table. Let Eid be the set of Entity Identifiers in M and let Iid be the set of Instance Identifiers in M. We say that f is a Resolution Function for M if f is a Total Function from Eid to Iid such that if f(e)=i then M maps e to i. The process of generating Resolution Functions can be described with reference to the Customer Data of Table 1 and the Entity Mappings of Table 4, from which the following four Resolution Functions $f_1, f_2, f_3$ and $f_4$ may be derived:

$$f_1(e_1)=C1; f_1(e_2)=C3; f_1(e_3)=C4 \qquad (1)$$

$$f_2(e_1)=C1; f_2(e_2)=C3; f_2(e_3)=C5 \qquad (2)$$

$$f_3(e_1)=C2; f_3(e_2)=C3; f_3(e_3)=C4 \qquad (3)$$

$$f_4(e_1)=C2; f_4(e_2)=C3; f_4(e_3)=C5 \qquad (4)$$

In summary, for the entity mappings of Table 4, all possible resolution functions resolve Entity $e_2$ with the data of Customer C3. Entity $e_1$ can be resolved with either the data of customer C1 or C2, and Entity $e_3$ can be resolved with either the data of customer C4 or C5.

An Inconsistent Dimensional Table, such as the Customer Data of Table 1, can be resolved by taking each Entity $e_1$ and retaining the attributes that correspond to the Instance chosen by the Resolution Function. Let D be a data warehouse and M be an Entity Mapping Table for the Inconsistent Dimensional Tables of D. Let f be a Resolution Function for M. Let R be an Inconsistent Dimensional Table of D. We say that R' is a Resolved Table for (R, f) if R' is a table obtained from R by: (i) removing the tuples whose Instance Identifier is not in the image of the Resolution Function f; and (ii) replacing the Instance Identifier Iid of each tuple with the Entity Identifier Eid such that (Eid, Iid) is in M. In an exemplary embodiment, the data warehouse contains at most one Inconsistent Dimensional Table so as to insure that a complete answer is produced and no answers are missed. As understood in the relevant art, if entity resolution is done and a query is run directly on an Inconsistent Database, the results apply to databases that may have a plurality of Inconsistent Dimensional Tables. See, for example, the paper "Efficient Management of Inconsistent Databases" by Fuxman et al., in which the class of queries is restricted to a proper subset of conjunctive queries.

The disclosed EBI method provides for: (1) an initial step of entity resolution; (2) the use of a "non-guaranteed" notion in the semantics for the answers that may not appear in every possible Consistent Database; (3) the computation of roll-up operations, which are fundamental for OLAP applications; (4) the materialization of intermediate results; and (5) a means for dealing with all conjunctive queries. Accordingly, if entity resolution has been done and the query has been run directly on the Inconsistent Database, the techniques presented in the Fuxman et al. paper and the EBI method of the present invention return the same result for a "guaranteed" answer. It should be understood that the techniques presented in the Fuxman et al. paper are not applicable to "non-guaranteed" answers, but rather, are applicable to databases that may have any number of inconsistent tables.

For example, the Inconsistent Dimensional Table 15, such as the Customer Data comprising Table 1 can be resolved using the function $f_1$ in (1) above, as in step 37, to replace Identity Identifiers with Entity Identifiers to obtain the Resolved Customer Data of Table 7A:

TABLE 7A

RESOLVED CUSTOMER DATA - $D_1$

| EntityID | City | State |
|---|---|---|
| $e_1$ | San Francisco | CA |
| $e_2$ | San Francisco | CA |
| $e_3$ | San Francisco | CA |

Similarly, the Customer Data of Table 1 can be resolved, in step 37, using the function $f_2$ in (2) above to obtain the Resolved Customer Data of Table 7B:

TABLE 7B

RESOLVED CUSTOMER DATA - $D_2$

| EntityID | City | State |
|---|---|---|
| $e_1$ | San Francisco | CA |
| $e_2$ | San Francisco | CA |
| $e_3$ | San Jose | CA |

Likewise, the Customer Data of Table 1 can be resolved, in step 37, using the function $f_3$ in (3) above to obtain the Resolved Customer Data of Table 7C:

TABLE 7C

RESOLVED CUSTOMER DATA - $D_3$

| EntityID | City | State |
|---|---|---|
| $e_1$ | San Jose | CA |
| $e_2$ | San Francisco | CA |
| $e_3$ | San Francisco | CA |

And, finally, the Customer Data of Table 1 can be resolved, in step 37, using the function $f_4$ in (4) above to obtain the Resolved Customer Data of Table 7D:

TABLE 7D

RESOLVED CUSTOMER DATA - $D_4$

| EntityID | City | State |
|---|---|---|
| $e_1$ | San Jose | CA |
| $e_2$ | San Francisco | CA |
| $e_3$ | San Jose | CA |

Entities that appear with the same information for all possible resolution (such as '$e_2$' which always appears with San Francisco, Calif.) are denoted as "consistent" entities. The remaining entities are denoted as "inconsistent" entities. It can be appreciated by one skilled in the art that, although the Transaction Fact Data in Table 2 is assumed to be clean, the data may comprise unresolved Instance Identifiers, that is, foreign keys to the Instance Identifiers of Inconsistent Dimensional tables. In the Transaction Fact Data of Table 2, transactions Tr1 and Tr2 correspond to different Instances $C_1$ and $C_2$, respectively. However, Instances $C_1$ and $C_2$ both correspond to the same Entity $e_1$, in accordance with the Entity Mappings of Table 4. In an exemplary embodiment, the Instances $C_1$ and $C_2$ are replaced with the Entity $e_1$. The product of having replaced each Instance by an Entity in the Transaction Fact Data of Table 2 is denoted herein as Resolved Transaction Fact Data, as exemplified by the data in Table 8.

TABLE 8

RESOLVED FACT DATA

| TransID | CustID | SalesAmt |
|---|---|---|
| Tr1 | $e_1$ | $20 |
| Tr2 | $e_1$ | $50 |
| Tr3 | $e_2$ | $30 |
| Tr4 | $e_3$ | $90 |
| Tr5 | $e_3$ | $40 |

Let D be a data warehouse and M be an Entity Mapping Table for the Inconsistent Dimensional Tables of D. We say that R' is a Resolved Transaction Fact Data Table for (D, f) if R' is a table obtained from R by replacing the Instance Identifier Iid of each tuple by the Entity Identifier Eid such that (Eid, Iid) is in M.

A Resolved Database 40 can be produced, at step 39, comprising the Consistent Dimensional Tables 11-13 from the data warehouse 10, a Resolved Dimensional Table 43, comprising data found in the Resolved Customer Data of tables 7A-7D, and a Resolved Fact Data Table 45, such as found in the Resolved Fact Data of Table 8. More particularly, let D be a data warehouse and M be an Entity Mapping Table for the Inconsistent Dimensional Tables of D. Let f be a Resolution Function for M. Then D is a Resolved Database for (D, f) if D comprises:
  a. at least one Resolved Fact Table for (D, f); and
  b. at least one Resolved Dimensional Table (R, f) for every Inconsistent Dimensional Table R of D; and
  c. a plurality of Consistent Dimensional Tables of D.

The EBI query process 20 of the present invention may consider OLAP queries of the following form:
  Select G, agg(e) as E
  from F
  where W
  group by G where G is the set of attributes for grouping (for example <City,State>), and agg(e) is an aggregate expression with function agg. The EBI query process 20 may also consider the MIN, MAX, SUM and COUNT operators of SQL, but for simplicity of illustration, only one aggregate expression is considered. The query process results may be extended to queries with multiple aggregate expressions. The 'select' clause may rename the aggregate expression to an attribute E. Desirably, emphasis is placed on queries where all the attributes in the group-by clause appear in the select clause. As can be appreciated by one skilled in the art, SQL queries may generally have some attributes in the group-by clause that do not appear in the select clause, but not necessarily vice versa.

In the definition of the semantics for query answering, a range may be provided for each value of G that is in the answer to the query. The range given for the aggregate expression has the following properties. First, the range is "correct" in that the value of the aggregation lies within the range for each Resolved Database. Second, the range is "tight," in that there exists at least one Resolved Database where the value of the aggregation equals the lower bound, and there also exists at least one Resolved Database where the value of the aggregation equals the upper bound.

More formally, a resolution-aware query answer may be defined as follows: Let D be a database and M be an Entity Mapping Table for the inconsistent tables of D. Let q be a query. We denote as q(D) the result of the query q on the resolved database $D_r$. Let E be the attribute renaming the aggregate expression of q. A resolution-aware query answer [a, b] satisfies $a \leq q(D) \leq b$ for every resolved database D and $q(D_a)=a$, for some resolved database $D_a$ and $q(D_b)=b$, for some resolved database $D_b$.

A grouping t(G) (like <San Fransisco,Calif.>) is in the resolution-aware answer to q on (D, M) if there exists at least one resolved database D for (D, M) such that $t(G) \in q(D)$. Note that, if a grouping t(G) appears in the result obtained from every Resolved Database, then the grouping is denoted a "guaranteed grouping." Otherwise, the grouping is denoted as a "non-guaranteed grouping." These terms can be more explicitly defined as follows: Let D be a data warehouse and let M be a mapping table for the Inconsistent Tables of D. Let q be a query and G the set of grouping-attributes. Then grouping t(G) is a guaranteed grouping to q on (D, M) if $t(G) \in q(D)$, for every resolved database D for (D, M). A grouping t(G) is a non-guaranteed grouping to q on (D, M) if $t(G) \notin q(D)$, for some resolved database D for (D, M).

To illustrate the EBI query process 20 of the present invention, the following query q1 may be run on the Resolved Database 40, as in step 41.

```
select city, state, min(amount)
From customer, transaction
where customer.cid = transaction.cid
group by city, state
```

The results of applying q1 to each of the Resolved Customer Data in Tables 7A-7D are the following Resolved Query Tables 9A-9D:

TABLE 9A

RESOLVED QUERY RESULT for $D_1$

| City | State | SalesAmt |
|---|---|---|
| San Francisco | CA | $20 |

TABLE 9B

RESOLVED QUERY RESULT for $D_2$

| City | State | SalesAmt |
|---|---|---|
| San Francisco | CA | $20 |
| San Jose | CA | $40 |

TABLE 9C

RESOLVED QUERY RESULT for $D_3$

| City | State | SalesAmt |
|---|---|---|
| San Jose | CA | $20 |
| San Francisco | CA | $30 |

TABLE 9D

RESOLVED QUERY RESULT for $D_4$

| City | State | SalesAmt |
|---|---|---|
| San Jose | CA | $20 |
| San Francisco | CA | $30 |

Resolution-aware answers for q1 may be obtained from the above Resolved Query Tables 9A-9D. The grouping <San Francisco, Calif.> is a "guaranteed" grouping since it appears in every resolved database. The lower bound for min (amount) is $20, since that is the result obtained from resolved databases $D_1$ and $D_2$. The upper bound is $30, as obtained in $D_3$ and $D_4$. The grouping <San Jose, Calif.> is a "non-guaranteed" grouping because it does not appear in $D_1$. The lower bound for San Jose is $20 (from $D_3$ and $D_4$) and the upper bound is $40 (from $D_2$).

In the present method, conceptually all possible resolutions are considered for the above example, and a group-by query in accordance with the EBI query process may be executed to produce the results shown in Table 10:

TABLE 10

EBI AGGREGATION RESULTS

| City | State | LowBound | UpBound | Status |
|---|---|---|---|---|
| San Francisco | CA | $20 | $30 | guaranteed |
| San Jose | CA | $20 | $40 | non-guaranteed |

Table 10 indicates that the query result for <San Francisco, Calif.> is strictly between $20 and $30. There is always at least one customer in <San Francisco, Calif.> for all resolutions, and the result status is, as explained above, guaranteed. However, the non-guaranteed status for the San Jose grouping means that there is at least one resolution where there is no customer in <San Jose, Calif.>, and the aggregation result may be undefined. However, for all other <San Jose, Calif.> resolution, the query result lies strictly between $20 and $40. A grouping is guaranteed, if and only if there are consistent entries for that particular grouping. In our example, entity $e_2$ is always in <San Francisco, Calif.> for all resolved Customer Data in Tables 7A-7D. In the following paragraphs, we denote as "All-Inconsistent" the case where all the participating entries of a grouping are inconsistent.

The certainty status of each group in resolved database D can thus be determined as either guaranteed or non-guaranteed. Note that, in Table 4 above, the entity $e_2$ is associated with only one customer, wherein the customer is from <San Francisco, Calif.>. Therefore, no matter how the Customer Data of Table 1 above is resolved, $e_2$ will continue to be associated with <San Francisco, Calif.>. That is, $e_2$ is consistent to be in <San Francisco, Calif.>. Since San Francisco appears in each of the Resolved Data in Tables 7A-7D, one skilled in the art may conclude that the above answer to query q1 is correct. In comparison, no guarantee can be given that any of the entities in Table 4 is from <San Jose, Calif.>.

Figure 3:
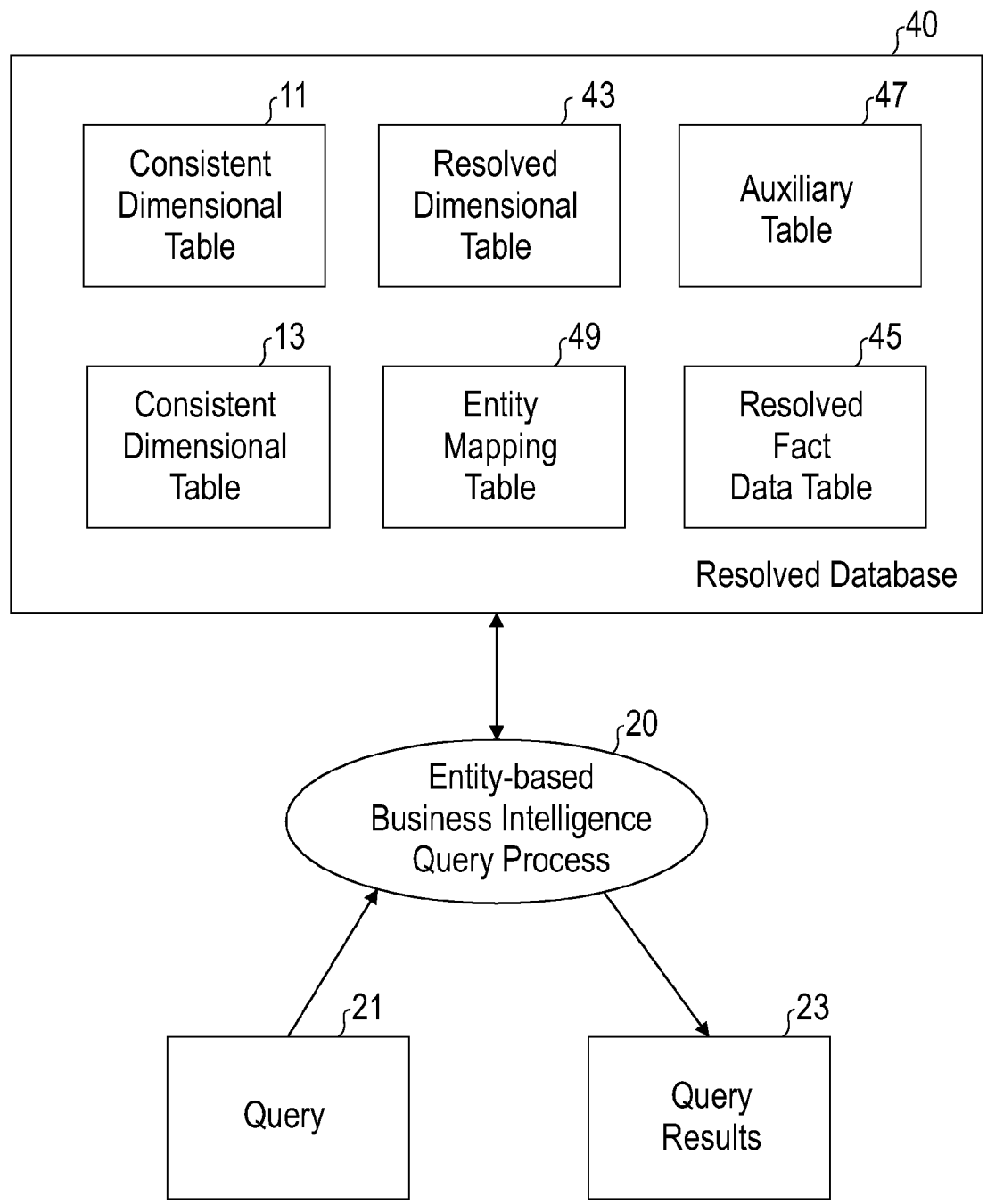
FIG. 3 is an illustration of a resolved database used in the entity-based business intelligence query process of FIG. 2.

By using the EBI query process 20 on the Resolved Database 40, as shown in FIG. 3, the OLAP model has been enhanced to incorporate inconsistency of dimensional data in query results and to provide a more accurate answer for a single aggregate. Moreover, the answer provided by the EBI query process 20 is not a number with a low probability of accuracy, as in the conventional result of Table 6, but rather an accurate numerical range, as exemplified by Table 10. This is a consequence of having advantageously reformulated the group-by query to compute upper and lower bounds of the requested aggregation.

In particular, the following aggregation-specific formulas may be used for computing the lower bound and the upper bound for a Count Aggregation Function for any particular grouping:

| | | |
|---|---|---|
| Lower | All-Inconsistent | 1 * |
| | Else | $\|C\|$ |
| Upper | All-Inconsistent | $\|I\|$ * |
| | Else | $\|C\| + \|I\|$ | where

"*" means that the corresponding grouping is not guaranteed.

"$\|C\|$" is the number of consistent entries; and

"$\|I\|$" is the number of inconsistent entries;

The lower bound of the Count Aggregation Function is zero and not guaranteed, if all entries are inconsistent. Otherwise it is equal to the number $|C|$ of consistent entries. The upper bound is non-guaranteed, and equal to the number $|I|$ of inconsistent entries, if and only if all the entries are inconsistent. If there is at least one consistent entry then the upper bound is equal to the sum of the number $|C|$ of consistent entries and the number $|I|$ of inconsistent entries.

The corresponding formula for computing a lower bound and an upper bound for a Sum Aggregation Function may be as follows:

| | | | |
|---|---|---|---|
| Lower | All-Inconsistent & All-positive | min(I+)* | |
| | All-Inconsistent & Some-negative | Sum(I-)* | |
| | Else | Sum(C) | + Sum(I-) |
| Upper | All-Inconsistent & All-negative | max(I-)* if all entries negative | inconsistent |
| | All-Inconsistent & Some-positive | Sum(I+)* | |
| | Else | Sum(C) | + Sum(I+) |

Where

"*" means that the corresponding grouping is not guaranteed;

"I+" corresponds to the positive measures of inconsistent entries; and

"I-" corresponds to the negative measures of inconsistent entries.

The lower bound for the Sum Aggregation Function is the minimum of the inconsistent measures if, and only if, all the entries are inconsistent and positive (or zero). If all the entries are inconsistent, and there are negative inconsistent measures, then the lower bound is equal to the sum of the negative inconsistent measures (if any). In both cases, since all the entries are inconsistent the result is not-guaranteed (denoted by '*' in the table above). If there is at least one consistent entry, then the lower bound is equal to the sum of the consistent measures to the sum of the negative inconsistent measures.

The upper bound is equal to the maximum negative inconsistent measure if, and only if, all entries are inconsistent and all inconsistent measures are negative. If, and only if, all entries are inconsistent, and there is at least one positive inconsistent measure, then the upper bound is equal to the sum of the positive inconsistent entities. In both cases, since all the entries are inconsistent the result is not-guaranteed (denoted by '*' in the table above) If there is at least one consistent entry, then the upper bound is guaranteed and equal to the sum of the consistent measures to the sum of the positive inconsistent entries.

For the Minimum Aggregation Function and referring to Table 10, the values in the "lowBound" column may be obtained by executing the query q1 on Tables 1 and 2 in the Unresolved Database. To obtain the values in the "upBound" column, it is first necessary to associate each Entity to the minimum value of the transactions performed by its customers. The result of this association is denoted herein as "MinTransaction". A MinTransaction result from the Unresolved Database of Tables 1, 2 and 4 may comprise the data given in Table 11:

TABLE 11

ENTITY MinTransaction RESULTS

| EntityID | MinValue |
|---|---|
| $e_1$ | 20 |
| $e_2$ | 30 |
| $e_3$ | 40 |

For non-guaranteed answers, it is sufficient to find the maximum values for all entities (consistent and inconsistent) in an aggregation group. In the example of Table 10, the upper bound of San Jose is $40, the greatest value in Table 11, as San Jose has no guaranteed entities. The Unresolved Database comprising Tables 1, 2 and 4 can thus be resolved by choosing a city different from San Jose for all entities, except for the entity having the greatest value.

For guaranteed query answers, only the consistent entities of the corresponding aggregation group may be considered. For example, in Table 10 the upper bound of San Francisco is $30, the value for the only consistent entity $e_2$ in the Entity MinTransaction Results of Table 11. The reason is that consistent entities appear in every Resolved Database. If an inconsistent entity has a lower value, the corresponding Unresolved Database may be resolved in such a way that the inconsistent entity is associated to an instance of a different aggregation group. For example, entity $e_1$ has a value of $20 and may be associated to <San Francisco, Calif.>. However, in Resolved Databases $D_3$ and $D_4$, $e_1$ is associated to <San Jose, Calif.>, but, does not affect the minimum amount for San Francisco.

Lower Bounds (lowBound) may be derived with the following code:

```
select G,
        min(measure) as lowBound
    from dimension D
        join fact F on F.instanceId=D.instanceId
    group by G
```

Upper Bounds (upBound) may be derived as follows. Denote the term EntitiesInfo as the following query:

```
select entityId,
    min(measure) as minMeasure,
    case when count (distinct G) = 1
        then "consistent"
        else "inconsistent" as
status
from dimension D
    join entityResolution ER
        on
D.instanceId=ER.instanceId
    join fact F
        on
F.instanceId=ER.instanceId
group by entityId
```

Denote GuaranteedGroups as the following query:

```
select entityId, G from entityResolution ER
    join EntityInfo EI
        on ER.entityId = EI.entityId
    Where status = "consistent"
```

Denote NonGuaranteedGroups as the following query:

```
select entityId, G
from entityResolution ER
Where not exists (select *
    from EntityInfo EI
    where EI.entityId =
ER.entityId
        and status =
"consistent")
```

The Upper Bounds and the Certainty Status may be obtained with the following code:

```
select G,
    max(minMeasure) as upBound,
    "non-guaranteed" as status
from EntityInfo EI
    join NonGuaranteedGroups NG
        on EI.entityId = NG.entityId
group by G
union all
select G,
    max(minMeasure) as upBound,
    "guaranteed" as status
from EntityInfo EI
    join GuaranteedGroups G
        on EI.entityId = G.entityId
where EI.status="consistent"
group by G
```

Generally, the Lower Bound may be computed directly by obtaining the minimum transaction for each grouping. The Upper Bound may be obtained as follows. First, two relevant pieces of information about the entities are obtained (i.e., query EntitiesInfo). One relevant piece is the Consistency Status (consistent or inconsistent) of the entity. The other relevant piece is the minimum value for the Measure Attribute (i.e., minMeasure), obtained from the Fact Table. The groupings having guaranteed status (i.e., query GuaranteedGroups) and the groupings having non-guaranteed status (i.e., query NonGuaranteedGroups) may be obtained. In the example of Table 10, above, <San Francisco, Calif.> was a guaranteed grouping, and <San Jose, Calif.> was a non-guaranteed grouping.

The resolution-aware answer may be obtained as the union of two subqueries. The first subquery addresses the guaranteed groups; the second subquery addresses the non-guaranteed groups. This distinction is made because, as described above, the Upper Bound may be computed differently depending on the Consistency Status of the corresponding grouping. For the non-guaranteed groupings, the upper bound may be obtained as the maximum value associated with the grouping.

For the guaranteed groups, analysis may emphasize the consistent entities associated with the group (i.e., EI.status="consistent"). It should be understood that, in general, a guaranteed group may have inconsistent entities. In the Resolved Customer Data of Tables 7A-7D, above, the guaranteed group <San Francisco, Calif.> comprises inconsistent entities $e_1$ and $e_3$, as well as consistent entity $e_2$. However, the inconsistent entities are not considered in the calculation of the Upper Bound.

In the current state of the art, computing a roll-up query may comprise reusing the result obtained at one hierarchy level to compute the next hierarchy level. However, this method may not be appropriate for computing a roll-up query on an Unresolved Database as Upper Bound information may not be computed correctly. That is, the results of a group-by query (or an initial roll-up query) cannot be directly aggregated into a higher hierarchical level without introducing errors, and without violating the condition that the resulting data range is strict.

The EBI query process 20 allows for directly aggregating data ranges into higher hierarchical levels and provides for efficient compensation of the data ranges. For example, the roll-up query may be performed in two steps. The first step (i.e., a direct roll-up query) works directly on the result of the previous aggregation query (e.g., a group-by query or a rollup query) for a lower hierarchical level H and produces an approximation for the results for a higher hierarchical level H+1. The second step (i.e., Compensation) then fixes the results by taking into account the consistency status of the entries at the hierarchical level H+1, for the entries that were inconsistent at the hierarchical level H and become consistent at the hierarchical level H+1. For example, for the Minimum Aggregation Function:

| Lower-approx | All-Inconsistent | Min(L)* |
|---|---|---|
| | Else | Min(L) |
| Upper-approx | All-Inconsistent | Max(U)* |
| | Else | Min(U) |

The lower bound approximation for the hierarchical level H+1 is non-guaranteed and equal to the minimum of the lower bounds at the hierarchical level H if and only if all entries are inconsistent. If there is at least one consistent entry then the lower bound approximation for hierarchical level H+1 is guaranteed and equal to the minimum of the lower bounds at the hierarchical level H. Similarly, if and only if all entries are inconsistent the upper bound approximation for hierarchical level H+1 is non-guaranteed and equal to the maximum of the upper bounds at hierarchical level H. If there is at least one consistent entry then the upper bound approximation for hierarchical level H+1 is guaranteed and equal to the minimum of the consistent upper bounds at hierarchical level H.

The Compensation for entries with measures V that were inconsistent at level H and become consistent at level H+1 can be determined with the following formula:

|       | All-Inconsistent | Else |
|-------|------------------|------|
| Lower | make guaranteed  | nothing |
| Upper | Min(V) and guaranteed | Min(U, V) |

The formula finalizes the lower and upper bound by taking into account all entries that were inconsistent at hierarchical level H and become consistent at hierarchical level H+1. For the lower bound, if before all entries were inconsistent and now there is at least one consistent then we make the grouping guaranteed. Similarly, for the upper bound, if before all the entries were inconsistent and now there is at least one consistent, we make the grouping guaranteed and set the upper bound to min(V). If before there was at least one consistent entry, then the final upper bound is the minimum of the upper bound approximation and V.

An alternate method of computing a roll-up query may comprise returning to the base tables and computing the resolution-aware result "from scratch." However, this is not practical since computing a query from the base tables may be computationally expensive. In accordance with the present method, a minimal amount of auxiliary information is computed at each hierarchical level. An auxiliary table 47 comprising the entities that become consistent at each level is maintained with the Resolved Database 40 during execution of the EBI query process 20, as shown in FIG. 3. The auxiliary table 47 may include one or more entries assigning one of a consistency status (i.e., consistent or inconsistent) or a probability value to one or more of the entries in the Entity Mapping Table 49 for the corresponding hierarchical level.

The Lower Bounds of a lower hierarchical level may be used to compute the Lower Bound of the higher hierarchical level. This process may be run using the following code, in which NonGuaranteed$_{i-1}$ denotes a table that contains the entities that are inconsistent at a previous hierarchical level, and Result$_{i-1}$ denotes a resolution-aware result for the previous hierarchical level. First, the Lower Bounds may be obtained as follows:

```
select G, min(Result_{i-1}.lowBound) as lowBound
from Result_{i-1}
```

Denote BecomeConsistent$_i$ as the following query:

```
select entityId, minMeasure
from Inconsistent_{i-1} C
where count(distinct G)=1
```

Denote UpperBoundsCompensation as the following query:

```
select G, min(BecomeConsistent_i.minMeasure) as upBound
from BecomeConsistent_i
```

Denote UpperBoundsPreviousLevel as the following query:

```
select G, min(Result_{i-1}.upBound) as upBound
from Result_{i-1}
where status="consistent"
```

The upper bounds of the Resolution-Aware result may be obtained as follows:

```
select G, min(UpperBounds.upBound) as upBound
from (select G, upBound
    from UpperBoundsCompensation
    union all
    select G, upBound
    from UpperBoundsPreviousLevel) UpperBounds
```

The input to the above algorithm comprises the query q to be computed, the result Result$_{i-1}$ from the previous level, and one table, denoted NonGuaranteed$_{i-1}$, containing auxiliary information. This information comprises the entities that are inconsistent at the previous level. At each level, except the base level, Inconsistent$_i$ may be computed by using the table Inconsistent$_{i-1}$ as follows.

```
select entityId, minMeasure
from Inconsistent_{i-1} C
where count(distinct G)>1
```

It can be appreciated by one skilled in the art that the condition count (distinct G)>1 may be satisfied by entities associated to more than one group, and are therefore inconsistent. When rolling up from base level, the auxiliary table Inconsistent$_0$ can be obtained from the base tables as follows:

```
select entityId,
    min(measure) as
minMeasure,
from dimension D
    join entityResolution ER
        on
D.instanceId=ER.instanceId
    join fact F
        on
F.instanceId=ER.instanceId
where count(distinct G)>1
group by entityId
```

The lower bound may be obtained directly by aggregating the minimum from the previous result. The upper bound may be computed as follows. The table BecomeConsistent$_i$ is obtained, and keeps the entities that were inconsistent at the previous level, but became consistent at the current one. For example, when rolling-up from city level to state level (i.e., CA), the two entities, $e_1$ and $e_3$, become consistent. That is, $e_1$ and $e_3$ were inconsistent at the city level, because these entities could be from either San Jose or San Francisco. However, the entities $e_1$ and $e_3$ are consistent at the state level, as both are clearly from California.

The minimum value for all groups may be obtained from the auxiliary table (i.e., query UpperBoundsCompensation). The minimum may be taken from the resolution-aware result obtained in a previous level for the guaranteed aggregation groups (i.e., query UpperBoundsPreviousLevel). The Upper Bound may be obtained by taking the minimum value from the results obtained in UpperBounds-Compensation and UpperBoundsPreviousLevel. Similar processes are required for rolling-up the aggregates of other aggregation functions like count, sum, and max.

In many situations, we are provided with the probabilities (pj) for the attributes of the inconsistent entries as depicted in Table 12:

TABLE 12

ENTITY MAPPING PROBABILITIES

| EntityID | CustID | $P_j$ |
|---|---|---|
| $e_1$ | $C_1$ | 0.2 |
| $e_1$ | $C_2$ | 0.8 |
| $e_2$ | $C_3$ | 1.0 |
| $e_3$ | $C_4$ | 0.4 |
| $e_3$ | $C_5$ | 0.6 |

In addition to the tight range for an aggregate, the mean and the variance can be computed. If rj are the corresponding measures, then for the basic aggregation functions (count, sum, avg) we have:

```
E[count]=Sum[pj]
V[count]=Sum[pj (1−pj) ]
E[sum]=Sum[rj pj]
V[sum]=Sum[rj 2 pj (1−pj) ]
E[avg] ≈E[sum]/E[count] =a
V[avg] = (V[sum] − 2a Cov[sum,count]
          + a^2 V[count]) / E^2[count]
Cov[sum, count] = Sumi [Sumj< >i [pi pj ri]]
          + Sum[pj rj]
          −Sum[pj rj]*Sum[pj]
          =Sum[rj pj (1−pj) ]
```

It should be understood, of course, that the foregoing relates to exemplary embodiments of the invention and that modifications may be made without departing from the spirit and scope of the invention as set forth in the following claims.

What is claimed is:

1. A method for executing aggregation queries in a pre-existing database, said method comprising the steps of:
   collecting database information from the pre-existing database, said database information including inconsistent dimensional tables and first fact tables;
   running an entity discovery process on said inconsistent dimensional tables and said first fact tables to produce entity mapping tables;
   using said entity mapping tables to generate at least one resolution function;
   allocating each of a plurality of tuples in said inconsistent dimensional tables to either a guaranteed group or to a non-guaranteed group, said guaranteed group including a plurality of guaranteed groupings, each one of the plurality of guaranteed groupings having a first instance identifier in an image of said at least one resolution function;
   resolving said inconsistent dimensional tables into resolved dimensional tables by removing one of the plurality of tuples from said inconsistent dimensional tables, said one of the plurality of tuples having no instance identifier in an image of said at least one resolution function and by replacing identity identifiers in said inconsistent dimensional tables with entity identifiers using said at least one resolution function to associate an entity to one instance;
   resolving said first fact tables into resolved first fact tables using said at least one resolution function;
   generating an auxiliary table that comprises entities of said entity mapping table that become consistent at hierarchical levels;
   producing a resolved database, wherein the resolved database comprises at least one resolved first fact table, at least one of the resolved dimensional tables, and a plurality of consistent dimensional tables;
   running the query efficiently on the pre-existing database including said resolved dimensional tables, resolved first fact tables and the auxiliary table to obtain a query result by obtaining a resolution-aware answer as the union of two subqueries, a first subquery, of said two subqueries, addressing said guaranteed group and a second subquery, of said two subqueries, addressing said non-guaranteed group, by computing an aggregate function for data in said resolved dimensional tables and said resolved first fact tables, said aggregate function having a strict range with an upper bound and a lower bound where a lower bound of a lower hierarchical level is used to compute a lower bound for a higher hierarchical level, and a second table is created containing entities that are inconsistent at a level selected just prior to a current selected level.

* * * * *